(12) United States Patent
Finn et al.

(10) Patent No.: US 10,291,904 B2
(45) Date of Patent: May 14, 2019

(54) AUTO COMMISSIONING SYSTEM AND METHOD

(71) Applicant: Otis Elevator Company, Farmington, CT (US)

(72) Inventors: Alan Matthew Finn, Hebron, CT (US); Hui Fang, Shanghai (CN); Arthur Hsu, South Glastonbury, CT (US)

(73) Assignee: Otis Elevator Company, Farmington, CT (US)

( * ) Notice: Subject to any disclaimer, the term of this patent is extended or adjusted under 35 U.S.C. 154(b) by 43 days.

(21) Appl. No.: 15/489,013

(22) Filed: Apr. 17, 2017

(65) Prior Publication Data

US 2017/0302909 A1    Oct. 19, 2017

Related U.S. Application Data

(60) Provisional application No. 62/323,864, filed on Apr. 18, 2016.

(51) Int. Cl.
| | |
|---|---|
| *H04N 13/00* | (2018.01) |
| *H04N 13/246* | (2018.01) |
| *G01C 25/00* | (2006.01) |
| *G01S 17/89* | (2006.01) |
| *G01S 7/497* | (2006.01) |
| *G06T 7/80* | (2017.01) |
| *H04N 9/47* | (2006.01) |

(52) U.S. Cl.
CPC .......... *H04N 13/246* (2018.05); *G01C 25/00* (2013.01); *G01S 7/4972* (2013.01); *G01S 17/89* (2013.01); *G06T 7/80* (2017.01); *G06T 2207/30204* (2013.01)

(58) Field of Classification Search
USPC .............. 348/42, 47, 48, 49, 50, 61, 67
See application file for complete search history.

(56) References Cited

U.S. PATENT DOCUMENTS

| | | | |
|---|---|---|---|
| 6,009,359 | A | 12/1999 | El-Hakim et al. |
| 7,274,469 | B2 | 9/2007 | Lou et al. |
| 7,275,008 | B2 | 9/2007 | Plyvanainen |
| 7,719,662 | B2 | 5/2010 | Bamji et al. |
| 7,777,761 | B2 | 8/2010 | England et al. |
| 7,860,301 | B2 | 12/2010 | Se et al. |
| 8,345,954 | B2 | 1/2013 | Daxauer et al. |
| 8,467,628 | B2 | 6/2013 | Coffman |

(Continued)

FOREIGN PATENT DOCUMENTS

| | | |
|---|---|---|
| EP | 2615580 A1 | 7/2013 |
| EP | 3075695 A1 | 10/2016 |

OTHER PUBLICATIONS

European Search Report dated Sep. 1, 2017 for European Patent Application No. 17166451.

(Continued)

*Primary Examiner* — Daquan Zhao
(74) *Attorney, Agent, or Firm* — Bachman & LaPointe, P.C.

(57) ABSTRACT

An installation process for a sensor associated with a passenger conveyance system, the process including at least partially automatically calibrating a sensor coordinate system to a world coordinate system via a calibration matrix, wherein the sensor coordinate system is at least partially obtained using a depth map.

20 Claims, 7 Drawing Sheets

(56) References Cited

U.S. PATENT DOCUMENTS

| | | | |
|---|---|---|---|
| 8,587,771 | B2 | 11/2013 | Xu et al. |
| 8,766,212 | B2 * | 7/2014 | Frijns .................... B82Y 10/00 |
| | | | 250/492.1 |
| 8,797,387 | B2 | 8/2014 | Huggett et al. |
| 8,929,645 | B2 | 1/2015 | Coffman |
| 9,161,019 | B2 | 10/2015 | Millett |
| 9,578,310 | B2 | 2/2017 | Baele et al. |
| 2002/0118113 | A1 | 8/2002 | Oku et al. |
| 2004/0045339 | A1 | 3/2004 | Nichani et al. |
| 2008/0001022 | A1 * | 1/2008 | Sa ............................ F41G 3/02 |
| | | | 244/3.1 |
| 2008/0100438 | A1 | 5/2008 | Marrion et al. |
| 2010/0246897 | A1 | 9/2010 | Lehning |
| 2013/0169759 | A1 * | 7/2013 | Godavarty ........... A61B 5/0073 |
| | | | 348/47 |
| 2015/0063680 | A1 | 3/2015 | Liu et al. |
| 2015/0181198 | A1 * | 6/2015 | Baele ....................... G06T 7/80 |
| | | | 348/46 |
| 2015/0254857 | A1 * | 9/2015 | Huang .................. G06T 3/0068 |
| | | | 382/154 |
| 2016/0295196 | A1 | 10/2016 | Finn et al. |

OTHER PUBLICATIONS

Heritage Recording and 3D Modeling with Photogrammetry and 3D Scanning, Fabio Remondino, Published: May 30, 2011.
https://adamselevator.com/product_support.asp.

* cited by examiner

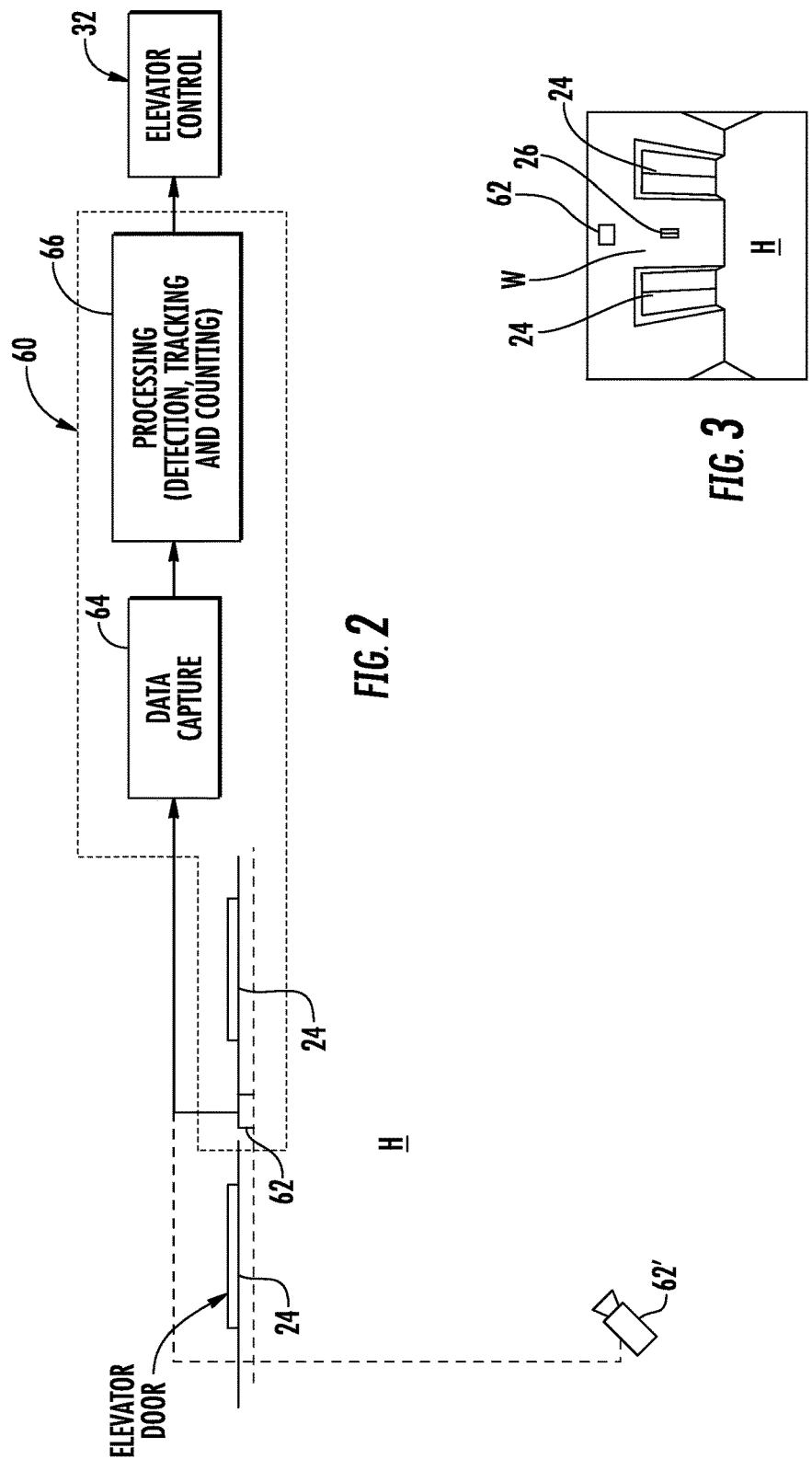

AUTO COMMISSIONING SYSTEM AND METHOD

CROSS-REFERENCE TO RELATED APPLICATIONS

Benefit is claimed of U.S. Patent Application No. 62/323,864, filed Apr. 18, 2016, and entitled "Auto Commissioning System and Method", the disclosure of which is incorporated by reference herein in its entirety as if set forth at length.

BACKGROUND

The present disclosure relates generally to calibration of 3D sensors and, more particularly, to 3D sensor installation in a passenger conveyance applications.

Installation of a passenger conveyance such as an elevator system may incur considerable expense and inconvenience in labor, time, test fixtures, measurement devices, and data entry. This may be exacerbated when one or more 3D depth sensors are used for additional functionality such as determining passenger expected time of arrival (ETA).

3D depth sensing systems typically employ a sensor-centric coordinate system wherein one dimension (depth) is radially away from the sensor and two other dimensions (u,v) are orthogonal to each other and perpendicular to the depth dimension corresponding to the center of the (u,v) plane. This sensor-centric system is often not in metric units, and is often not aligned with a world coordinate system (x,y,z) where x, y, and z are mutually orthogonal, the (x,y) plane is the floor of a building or structure, and the z dimension is vertical. In this context, metric units are not limited to those of the International System of Units (SI), also known as the Metric System, but denote any mensuration units readily convertible to Metric System units. Similarly, a world coordinate system is any coordinate system different from an inherent sensor-centric coordinate system and is often a Cartesian coordinate system.

Calibration of installed 3D depth sensing systems to world coordinates in metric units might employ 4 independent locations at different, independent, measured, (x,y,z) world coordinates. The 4 locations might be of 'found' objects that happen to be in the Field of View (FoV). However, for a professional installation, a portable 3D calibration jig might be carefully emplaced at measured world coordinates and calibration data of this jig taken by the 3D depth sensor. With data of the world coordinates $(x_i,y_i,z_i)$, and the corresponding 3D depth sensor observed coordinates, $(u_i,v_i,d_i)$, i=1, . . . 4, a transform matrix can be solved to achieve calibration. More than 4 points may be measured for a more robust solution using least squares techniques.

Conventional 2D systems that use a single image sensor do not have enough information to map sensed objects to a world coordinate system (invert the 3D to 2D projection). Such systems might utilize multiple views of some moving object to compute calibration parameters, but this calibration is ambiguous in scale since there is no absolute size reference. This approach is further complicated in that some moving objects move in a non-uniform manner and deform during movement.

Individual sensor calibration typically consists of determining the 6 extrinsic sensor parameters that are used in the computation of a transform matrix (sometimes also called a projection, translation and rotation matrices, or their inverses). The 6 extrinsic parameters are x, y, z offsets from the origin of a world coordinate system and the pitch, yaw, and roll angles with respect to the world coordinate axes. A complete calibration might include determining both the 6 extrinsic parameters and an additional 5 intrinsic parameters. As is well-known, the 5 intrinsic parameters are fx and fy (the focal lengths), $x_0$ and $y_0$ (the principle point offsets), and s (the axis skew). This can be thought of as a 2D translation, 2D shear, and 2D scaling. The intrinsic parameters are typically known, e.g., from manufacturer's data, or may be determined by known techniques prior to installation of the sensor.

However, there has been relatively little experience with 3D sensor automatic calibration, particularly where some or all of the extrinsic calibration parameters are known a priori. Conventionally, a tedious calibration approach is taught to manually place a number of detectable objects in the 3D sensor's Field of View (FOV), maintain the objects stationary at their locations, and measure the locations in both world coordinates and in sensor coordinates. This procedure may be simplified using a special 3D calibration target or jig of known dimensions.

With a sufficient number of unique measurements, a mathematical equation may be solved to determine the transform matrix. Often more than the minimum number of measurements are used (at the expense of even further effort and possible error) to compute a more robust solution.

The mathematical equation may be formulated as $$Tx_s = x_w$$

Where $x_s=(u,v,d)$ is a point's coordinates in the sensor coordinate system, $x_w=(x,y,z)$ is the same point's coordinates in the world coordinate system, and T is the desired transformation matrix, which can be expressed in homogeneous coordinates as:

$$T = \begin{bmatrix} m_{11} & m_{12} & m_{13} & m_{14} \\ m_{21} & m_{22} & m_{23} & m_{24} \\ m_{31} & m_{32} & m_{33} & m_{34} \\ 0 & 0 & 0 & 1 \end{bmatrix}$$

This may be reformulated as $$A*M=B \qquad (1)$$

where $$A = \begin{bmatrix} c_{11} & c_{12} & c_{13} & 1 & 0 & 0 & 0 & 0 & 0 & 0 & 0 & 0 \\ 0 & 0 & 0 & 0 & c_{11} & c_{12} & c_{13} & 1 & 0 & 0 & 0 & 0 \\ 0 & 0 & 0 & 0 & 0 & 0 & 0 & 0 & c_{11} & c_{12} & c_{13} & 1 \\ \vdots & \vdots & \vdots & \vdots & \vdots & \vdots & \vdots & \vdots & \vdots & \vdots & \vdots & \vdots \\ c_{n1} & c_{n2} & c_{n3} & 1 & 0 & 0 & 0 & 0 & 0 & 0 & 0 & 0 \\ 0 & 0 & 0 & 0 & c_{n1} & c_{n2} & c_{n3} & 1 & 0 & 0 & 0 & 0 \\ 0 & 0 & 0 & 0 & 0 & 0 & 0 & 0 & c_{n1} & c_{n2} & c_{n3} & 1 \end{bmatrix}$$

-continued $$M = \begin{bmatrix} m_{11} \\ \vdots \\ m_{14} \\ m_{21} \\ \vdots \\ m_{24} \\ m_{31} \\ \vdots \\ m_{34} \end{bmatrix} \quad B = \begin{bmatrix} x_1 \\ y_1 \\ z_1 \\ \vdots \\ x_n \\ y_n \\ z_n \end{bmatrix}$$

It should be understood that a transform matrix or, equivalently, a calibration matrix, is a convenient, concise representation of the consistent relationship between a point in one coordinate system and the same point in another coordinate system. The calibration taught herein is not restricted by this matrix representation and other equivalent geometric and analytical representations are disclosed herein to illustrate this.

$M \in \mathbb{R}^{12 \times 1}$ are the first 12 elements of T in a column, $A \in \mathbb{R}^{3n \times 12}$ contains the projection of the n measured points in the sensor coordinates into the world coordinate system, and $B \in \mathbb{R}^{3n \times 1}$ contain the coordinates of n points in world coordinates. Here, the $c_{ij}$ are the projection of the sensor image and depth (u,v,d) to sensor coordinates via the sensor intrinsic parameters. Solving eq. (1) for M by least squares produces the values for the desired transform matrix.

Although effective, special calibration targets and significant installer effort may be required by present methods.

SUMMARY

An installation process for a 3D sensor, the process according to one disclosed non-limiting embodiment of the present disclosure can include at least partially automatically calibrating a sensor coordinate system to a world coordinate system via a calibration matrix, wherein the world coordinate system is at least partially obtained using a depth map.

A further embodiment of the present disclosure may include determining a height of the 3D sensor; and at least partially automatically calibrating the sensor coordinate system to the world coordinate system in response to the height of the 3D sensor via the calibration matrix.

A further embodiment of the present disclosure may include determining a pitch of the 3D sensor; and at least partially automatically calibrating the sensor coordinate system to the world coordinate system in response to the pitch of the 3D sensor via the calibration matrix.

A further embodiment of the present disclosure may include wherein determining the pitch of the 3D sensor includes placing a target with reference to a fiducial mark generated by the 3D sensor in an X-direction.

A further embodiment of the present disclosure may include wherein determining the pitch of the 3D sensor includes using the distance in the X-direction and the height of the 3D sensor to calculate the pitch of the 3D sensor.

A further embodiment of the present disclosure may include determining a floor plane as a frame of reference for the world coordinate system.

A further embodiment of the present disclosure may include wherein determining the pitch of the 3D sensor includes utilizing an inclinometer.

A further embodiment of the present disclosure may include wherein determining the pitch of the 3D sensor includes direct measurement.

A further embodiment of the present disclosure may include wherein determining the pitch of the 3D sensor includes utilizing a projector.

A further embodiment of the present disclosure may include wherein the projector emits a coherent beam.

A further embodiment of the present disclosure may include wherein determining the pitch of the 3D sensor includes utilizing a laser.

A further embodiment of the present disclosure may include wherein the projector emits an incoherent beam.

A further embodiment of the present disclosure may include wherein determining the pitch of the 3D sensor includes projecting electromagnet radiation.

A further embodiment of the present disclosure may include wherein determining the pitch of the 3D sensor includes projecting a pattern.

An auto-calibration system according to one disclosed non-limiting embodiment of the present disclosure can include a depth-sensing sensor; and a processor in communication with the depth-sensing sensor, the processor operable at least partially automatically calibrating a sensor coordinate system to a world coordinate system via a calibration matrix, wherein the world coordinate system is at least partially obtained using a depth map.

A further embodiment of the present disclosure may include wherein the depth-sensing sensor includes at least one of structured light, phase shift, time of flight, stereo triangulation, sheet of light triangulation, light field cameras, coded aperture cameras, computational imaging techniques, simultaneous localization and mapping (SLAM), imaging radar, imaging sonar, scanning LIDAR, and flash LIDAR.

A further embodiment of the present disclosure may include a device operable to determine the pitch of a sensor.

A further embodiment of the present disclosure may include wherein the processor is operable to determine a floor plane as a frame of reference for the world coordinate system.

A further embodiment of the present disclosure may include wherein the device includes at least one of an inclinometer, a projector, and a display.

A further embodiment of the present disclosure may include wherein the auto-calibration system is operable for a passenger conveyance system.

The foregoing features and elements may be combined in various combinations without exclusivity, unless expressly indicated otherwise. These features and elements as well as the operation thereof will become more apparent in light of the following description and the accompanying drawings. It should be appreciated, however, that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 2 is a block diagram of an elevator system according to another disclosed non-limiting embodiment;

FIG. 3 is a perspective view of an elevator system according to another disclosed non-limiting embodiment;

DETAILED DESCRIPTION

Figure 1:
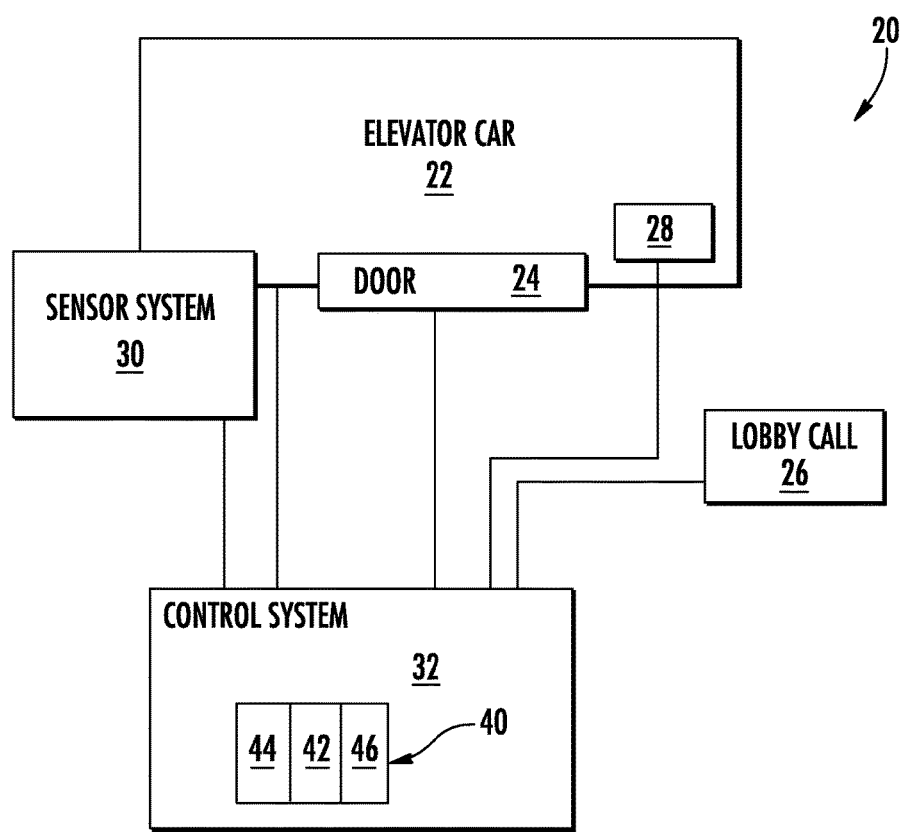
FIG. 1 is a schematic view of an elevator system according to one disclosed non-limiting embodiment.

FIG. 1 schematically illustrates a passenger conveyance system 20 such as an elevator system. The system 20 can include an elevator car 22, an elevator door 24, a lobby call 26, a car-operating panel (COP) 28, a sensor system 30, and a control system 32. It should be appreciated that although an elevator system is disclosed and illustrated as an example herein, other passenger conveyance systems such as mass transit vehicles as well as other non-passenger conveyance systems will also benefit herefrom. It should be further appreciated that although particular systems are separately defined, each or any of the systems can be otherwise combined or separated via hardware and/or software.

Various elevator systems can utilize a passenger initiated input to signal the need for elevator service. For example, input from the lobby call 26 may include a push button, e.g., up, down, desired destination, or any other desired interaction, to request elevator service. The passenger initiated input (e.g., via a call button) may notify the control system 32 of the presence of a passenger awaiting elevator service. In response, the control system 32 may dispatch the elevator car 22 to the appropriate floor. Optionally, once inside the elevator car 22, the passenger may push a button on the car-operating panel (COP) 28 designating the desired destination, direction, or the like, and then the control system 32 may dispatch the elevator car 22 to that destination.

The control system 32 can include a control module 40 with a processor 42, a memory 44, and an interface 46. The control module 40 can be a portion of a central control for the elevator system, a stand-alone unit, or other system such as a cloud-based system. The processor 42 can include any type of microprocessor or other processing device having desired performance characteristics. The memory 44 may include any type of computer readable medium that stores the data and control processes disclosed herein. That is, the memory 44 is an example computer storage media that can have embodied thereon computer-useable instructions such as a process that, when executed, can perform a desired method. The interface 46 of the control module 40 can facilitate communication between the control module 40 and other systems.

With reference to FIG. 2, a depth-sensor based passenger sensing system 60 can include a sensor 62 that communicates with a data capture module 64, and a processing module 66. The depth-sensor based passenger sensing system 60 can be a portion of the control system 32, a stand-alone unit, or other system such as a cloud-based system in communication with the control system 32. The data capture module 64, and the processing module 66 can be particular to the sensor 62 to acquire and process the data therefrom. In one example, the sensor 62, through the data capture module 64 and the processing module 66, is operable to obtain depth map data and, using such depth map data, detect the presence of a passenger in the lobby H, an estimated time of arrival (ETA) of the passenger at the elevator, a number of passengers in the lobby H, and other useful information.

The sensor 62, according to one disclosed non-limiting embodiment, can be installed in a wall W of a lobby H (FIG. 3). The sensor 62 in this disclosed non-limiting embodiment includes a depth-sensing sensor. It should be appreciated that the term "sensor," is used throughout this disclosure for any 1D, 2D, or 3D depth sensor, or combination thereof. Such a sensor can be operable in the electromagnetic or acoustic spectrum capable of producing a depth map (also known as a point cloud or occupancy grid) of the corresponding dimension(s). Various depth sensing sensor technologies and devices include, but are not limited to, a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, scanning LIDAR, and flash LIDAR, or a combination comprising at least one of the foregoing. Different technologies can include active (transmitting and receiving a signal) or passive (only receiving a signal) and may operate in a band of the electromagnetic or acoustic spectrum such as visual, infrared, ultrasonic, etc. The use of depth sensing can have specific advantages over conventional 2D imaging. In one embodiment, the use of infrared sensing can have specific benefits over visible spectrum imaging such that alternatively, or additionally, the sensor can be an infrared sensor with one or more pixels of spatial resolution, e.g., a Passive Infrared (PIR) sensor or small IR Focal Plane Array (FPA).

Notably, there can be qualitative and quantitative differences between 2D imaging sensors, e.g., conventional security cameras, and 1D, 2D, or 3D depth sensing sensors to the extent that the depth-sensing provides numerous advantages. In 2D imaging, the reflected color (mixture of wavelengths) from the first object in each radial direction from the imager is captured. The 2D image, then, is the combined spectrum of the source illumination and the spectral reflectivity of objects in the scene. The source illumination is typically ambient illumination not specifically associated with or designed for the 2D sensor. A 2D image can be interpreted by a person as a picture. In 1D, 2D, or 3D depth-sensing sensors, there is no color (spectral) information; rather, the distance (depth, range) to the first reflective object in a radial direction (1D) or directions (2D, 3D) from the sensor is captured. 1D, 2D, and 3D technologies may have inherent maximum detectable range limits and can be of relatively lower spatial resolution than typical 2D imagers. The use of 1D, 2D, or 3D depth sensing typically can advantageously provide improved operations compared to conventional 2D imaging such as relative immunity to ambient lighting problems, better separation of occluding objects, and better privacy protection. In addition, the use of infrared sensing typically has specific benefits over visible spectrum imaging. A 2D image may not be converted into a depth map nor may a depth map be converted into a 2D image. An artificial assignment of contiguous colors or grayscale to contiguous depths may allow a person to crudely interpret a depth map somewhat akin to how a person sees a 2D image, but this assignment does not produce an image in the conventional sense. This inability to convert a depth map into an image might seem a deficiency, but it can be advantageous in certain analytics applications disclosed herein.

The sensor 62 can be, in one example, an eye-safe scanning LIDAR in which the field-of-view (FOV) can be, for example, about 180 degrees horizontal by 90 degrees vertical, which can cover the entire area of a lobby or other area adjacent to the elevator doors 24 (FIG. 3). In alternative embodiments sensor 62 may be a flash LIDAR, time of flight sensor, structured light sensor, and the like as disclosed elsewhere herein. For an active sensor, which emits a signal in order to detect range, each data point represents the reflection of a physical object point in the FOV, from which range and angles to that object point can be obtained. The scanning rate of LIDAR can be, for example, 50 ms per scan, which facilitates a reliable track of a passenger. That is, before application of analytic processes via the processing module 66, the LIDAR scan data can be converted to an occupancy grid representation. Each grid represents a small region, e.g., 5 cm×5 cm×5 cm. The status of the grid can be indicated digitally, e.g., 1 or 0, to indicate whether each grid cube is occupied. Thus, each data scan can be converted to a binary map and these maps then used to learn a background model of the lobby, e.g. by using processes designed or modified for depth data such as a Gaussian Mixture Model (GMM) process, principal component analysis (PCA) process, a codebook process, or a combination including at least one of the foregoing.

The processing module 66 may utilize various 3D detection and tracking processes such as background subtraction, frame differencing, Bayesian filter tracking, and/or spurious data rejection. A depth background can be computed which can be used to segment foreground objects, e.g., a potential passenger, from the background, e.g., walls and floors, via a code-book model, Gaussian Mixture Model, Non-Gaussian Mixture Model, PCA, and the like. The background model (also known as a "frame") may be subtracted from the current depth data (frame) to determine a foreground detection. Before and/or after background subtraction and foreground detection, spurious data rejection (disclosed elsewhere herein) may be used to remove isolated small foreground regions (also known as "noise") and to segment moving objects, called blobs, for further analysis. The blobs can then be segmented in 3D based on depth discontinuity. Passenger location or tracking may be based on the segmented blobs using a Bayesian Filter method such as a Kalman Filter or a Particle Filter. It will be understood that these operations are carried out on 3D data and 2D algorithms with similar names must be appropriately modified to operate on 3D data.

Spurious data can be inherent to depth sensing and may vary with the particular technology employed. For active techniques, where a particular signal is emitted and subsequently detected to determine depth (e.g., structured light, time of flight, LIDAR, and the like), highly reflective surfaces may produce spurious depth data, e.g., not the depth of the reflective surface itself, but of a diffuse reflective surface at a depth that is the depth to the reflective surface plus the depth from the reflective surface to some diffusely reflective surface. Highly diffuse surfaces may not reflect a sufficient amount of the transmitted signal to determine depth, therefore resulting in spurious gaps in the depth map. Even further, variations in ambient lighting, interference with other active depth sensors or inaccuracies in the signal processing may result in spurious data.

Spurious data may be rejected by morphological operations to remove isolated small foreground regions (e.g., those which can also be "noise"). 3D data may have self-occlusion, e.g., "shadows", in an occupancy grid. An approach to spurious data rejection may include extension of a 2D connected components process to include an "unknown" category in the occupancy grid for 3D morphological filtering. Next, size filtering can be performed as a function of range which may remove objects below a predetermined size. The objects can then be segmented in 3D based on depth discontinuity. It is possible that some objects after depth discontinuity segmentation will be relatively small, e.g., someone almost entirely occluded by another person will appear as a small blob. This approach can be used to detect, locate or track such small objects so they can be classified rather than filtering them out. Morphological filtering can be used to remove a blob if selected characteristics, such as height, width, aspect ratio, volume, acceleration, velocity, and/or other spatiotemporal characteristics are outside a detection threshold (e.g., dynamically calculated threshold, static threshold, or the like). Additionally, geometric filtering can be applied to further remove spurious blobs outside the scene boundary. The depth background defines a 3D scene boundary of the environment. A "blob" representing a real object should be within the 3D boundary. That is, if a blob's depth is larger than the depth of the corresponding location of the depth background, then the blob is outside of the 3D boundary and can be removed, e.g., a blob detected from reflective surfaces such as a mirror.

Figure 6:
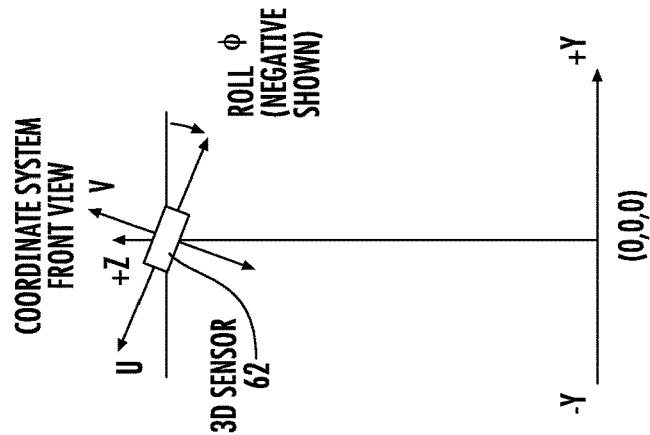
FIGS. 4-6 are views of a 3D sensor installation.
Figure 5:
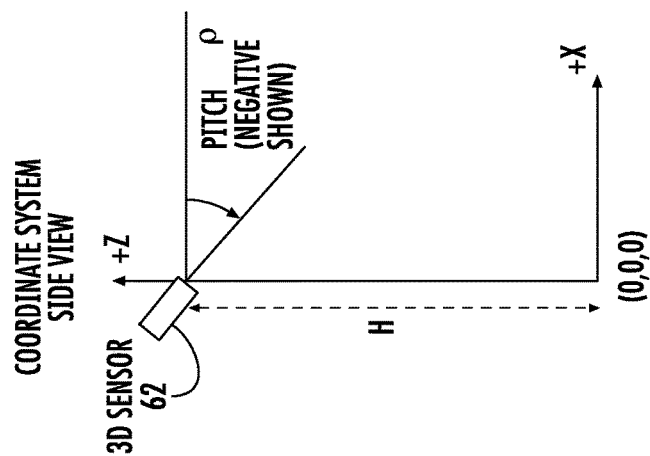
Figure 4:
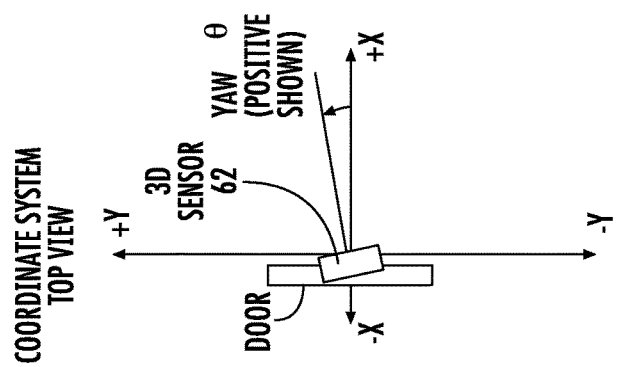
Figure 7:
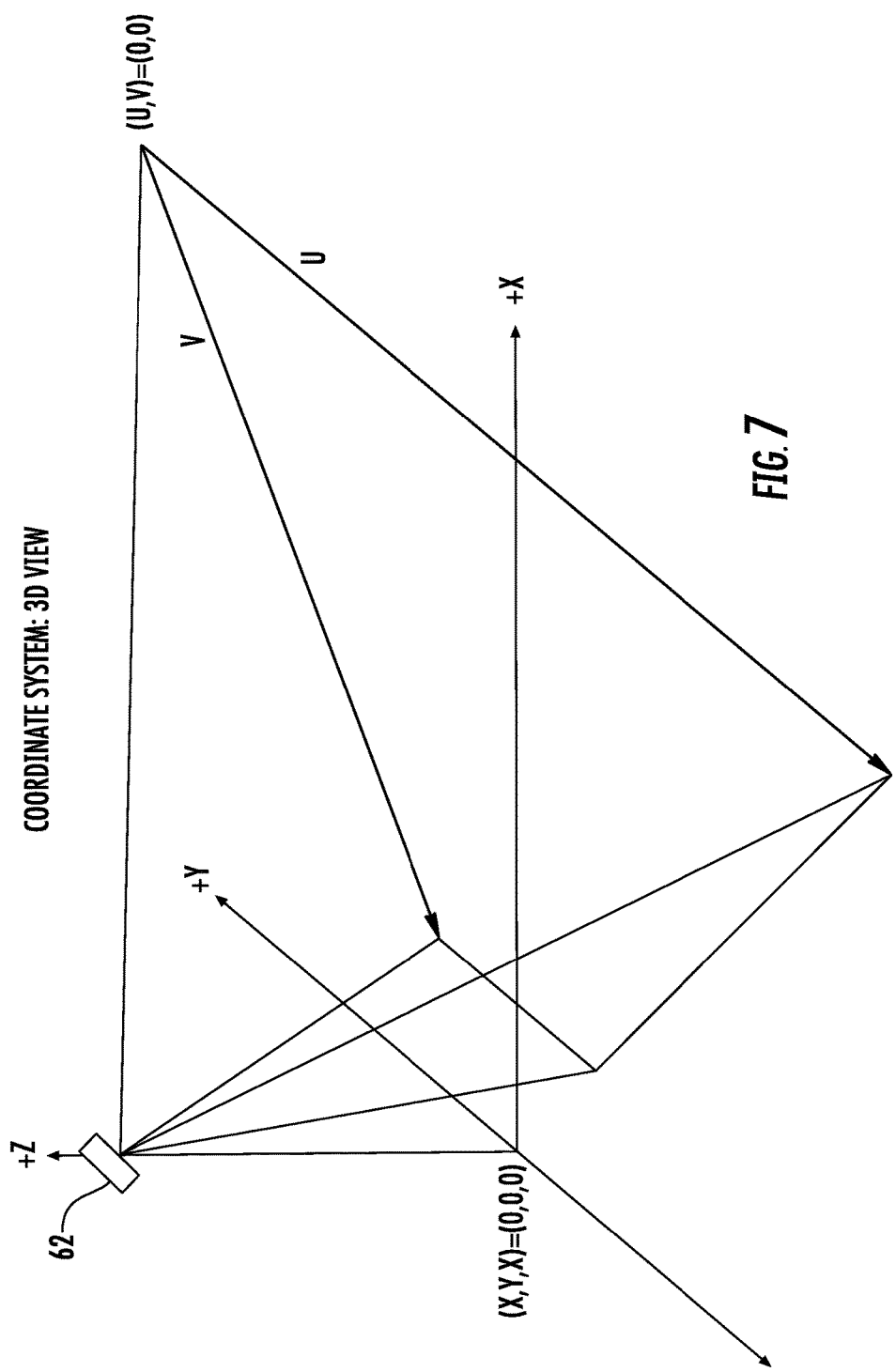
FIG. 7 is a perspectives view of a 3D sensor installation.

With reference to FIGS. 4-7, the world (x,y,z) and sensor (u,v,d) coordinate systems are defined for subsequent reference. In FIG. 4, a positive yaw θ is shown. In subsequent discussion, the yaw will be zero by definition, that is, the world +x direction will be defined as being aligned with the −v direction (FIG. 7) of the middle of the sensor (u,v) FoV when the sensor is mounted in the +z direction and aimed substantially at the floor of the world coordinate system. FIG. 5 shows a negative pitch ρ where the sensor at h>0 above the floor (x,y) plane is aimed more downward towards the floor plane of the world coordinate system. FIG. 6 shows a negative roll Φ. While FIGS. 4-7 depict a sensor mounted directly above the origin of a world coordinate system, where the world coordinate system origin is substantially at the base of a passenger conveyance door, it should be understood that the calibration taught herein does not depend on a specific relationship of the sensor to a particular world coordinate system nor to the relationship of the world coordinate system to a passenger conveyance door.

The intrinsic parameters of a 3D sensor are typically determined by the manufacturer and may be assumed to be known. However, if not known, they may be readily determined by well-known techniques. The remaining parameters required for calibration are the (x,y,z) translations between the world coordinate system and the sensor coordinate system and (ρ, θ, Φ) the pitch, yaw, and roll rotations between the world coordinate system and the sensor coordinate system.

Assuming the origins and scaling of the sensor and world coordinate coincide, the rotations of a point in world coordinates to sensor coordinates is then $$T(u,v,d)=(x,y,z) \text{ or equivalently } (u,v,d)=T^T(x,y,z) \qquad (1)$$

where $T \in \mathbb{R}^{3\times 3}$ is a rotation matrix with 3 independent parameters (ρ, θ, Φ), superscript $T$ denotes transpose, and, as is well-known, the inverse of a rotation matrix is its transpose. This rotation matrix T may be decomposed as $T=T_x T_y T_z$, i.e., decomposed into rotations about each coordinate axis as a rotation $T_x$ about the x axis, $T_y$ about the y axis, and $T_z$ about the z axis:

$$T_x = \begin{bmatrix} 1 & 0 & 0 \\ 0 & \cos(\Phi) & \sin(\Phi) \\ 0 & -\sin(\Phi) & \cos(\Phi) \end{bmatrix} \quad (2)$$

$$T_y = \begin{bmatrix} \cos(\rho) & 0 & \sin(\rho) \\ 0 & 1 & 0 \\ -\sin(\rho) & 0 & \cos(\rho) \end{bmatrix} \quad (3)$$

$$T_z = \begin{bmatrix} \cos(\theta) & \sin(\theta) & 0 \\ -\sin(\theta) & \cos(\theta) & 0 \\ 0 & 0 & 1 \end{bmatrix} \quad (4)$$

In one embodiment, the 3D sensor and associated T matrix may be pre-calibrated for specified design conditions, e.g., height h, pitch $\rho$, and roll $\Phi$ (typically zero) by any known method including those disclosed herein. If the sensor is installed at the design height, pitch, and roll, then the pre-calibrated T matrix may be used and no additional calibration is needed.

In an alternative embodiment, a fully automatic calibration process will be described. In this embodiment, some installation conditions may make it impossible or undesirable to install the sensor 62 at the designed operating height. Under these conditions it may be necessary to install the sensor 62 at a different height h' and to change the pitch to some value $\rho'$ such that approximately the same field of view (FOV) is seen by sensor 62 as if it was mounted at the designed operating height and pitch. In this embodiment the roll is assumed to be zero as designed. The new height h' is the orthogonal distance from the sensor to a world coordinate system floor plane.

The floor plane may be determined directly from the sensor data. First, a floor plane area is obtained. A plane is a 2D surface z=mx+py+b where m, p, and b are the plane's parameters. The parameters of a plane can be found by solving eq. (5) for n planar points:

$$\begin{bmatrix} \sum_{i=1}^{n} x_i^2 & \sum_{i=1}^{n} x_i y_i & n\bar{x} \\ \sum_{i=1}^{n} x_i y_i & \sum_{i=1}^{n} y_i^2 & n\bar{y} \\ \bar{x} & \bar{y} & 1 \end{bmatrix} \begin{bmatrix} m \\ p \\ b \end{bmatrix} = \begin{bmatrix} \sum_{i=1}^{n} x_i z_i \\ \sum_{i=1}^{n} y_i z_i \\ \bar{z} \end{bmatrix} \quad (5)$$

Any three points define a plane and using n=3 would potentially result in very many planes, most of them not the desired floor plane. A random sample consensus (RANSAC) algorithm may be used to find consistent sets of n>>3 planar points. This set of points may then be expanded to encompass an entire floor plane area by adding points that lie on the plane within some small noise tolerance. From all the planes found in this manner, additional logic may be used to distinguish which plane is the floor. The additional logic may include determining which plane has the largest extent, includes the lowest elevation point(s), is in contact with lowest extreme of any moving objects, and the like. The floor plane area in the (u,v,d) sensor coordinate system is, by definition, a floor plane area in the world coordinate system where z is zero by definition.

To learn the floor plane, an assumption may be performed that the floor is flat and thus a certain region in view of the sensor that sees the floor plane as, for example, e the lower ⅓ of the sensor view, or the bottom-middle section, where the bottom third section is assumed to see the floor plane. In other words, the installer must make sure that these assumptions are satisfied or else move away objects that are on the floor plane in that predefined region or move the sensor. Alternatively, the installer inputs information about the location of the floor plane (e.g., the installer sees the depth map and using an user interface marks out a region in the depth map (or analogous RGB image) that corresponds with the floor plane, avoiding flower pots, columns, etc.).

The transformation of the floor plane area in sensor coordinates to the floor plane area in world coordinates can be thought of as a translation by −h' to align the origins of the coordinate systems followed by rotations $T_x$, $T_y$, and $T_z$ about the coordinate axes. The computation of the parameters h', $\rho'$, $\theta'$, and $\Phi'$ for the translation and rotations may then be formulated as a non-linear optimization to find the minimum error between the projected floor plane for a given $\rho'$, $\theta'$, $\Phi'$ and h' and the actual floor plane (where z is identically zero), e.g., $\min_{h',\rho',\theta',\Phi} \|[x, y, z]' - T[u, v, d]'\|_2$. Other problem formulations and norms may be used to solve for the same parameters. However, in general, and for example, but not limiting thereto, x and y will not be known and this formulation must be restricted to known data.

Since the yaw is defined to be zero, the only known values in the world coordinate system are $z \stackrel{\text{def}}{=} 0$ for the for plane, and the inverse of a rotation matrix is its transpose, the computation can be simplified to $$\min_{h',\rho',\theta'} \|\cos(\Phi')\sin(\rho')u + \sin(\Phi')v + \cos(\Phi')\cos(\rho')d + h'\|_2 \quad (6)$$

Solving equation (6) for the points (u,v,d) known to be on the floor plane will produce the installed height, pitch, and roll. Equation (6) may be made more general if the yaw is not taken to be identically zero and may be made simpler if the roll is additionally taken to be identically zero. For instance, if both the pitch and height are unknown, but the roll and yaw are known to be zero, the solution may be simplified by using the known intrinsic parameters for the vertical FoV and vertical resolution V. That is, with the known vertical angle between the top and bottom of the FoV and the distances to the floor plane (assuming, temporarily, both these points are on the floor plane) a side-angle-side triangle is formed and, from the law of cosines and the law of sines, the distances of each side and the included angles of the triangle may be computed. The pitch, then, is minus the angle opposite the sensor and the height is computed by tangent as explained elsewhere. If the top and bottom of the FoV are not on the floor plane, then any two points $v_1$ and $v_2$ along the same vertical column (constant u) that are on the floor plane may be used with the angle scaled by the vertical separation $$\frac{|v_2 - v_1|}{V}.$$

For a more robust solution more pairs of points may be used in a least squares solution.

Figure 8:
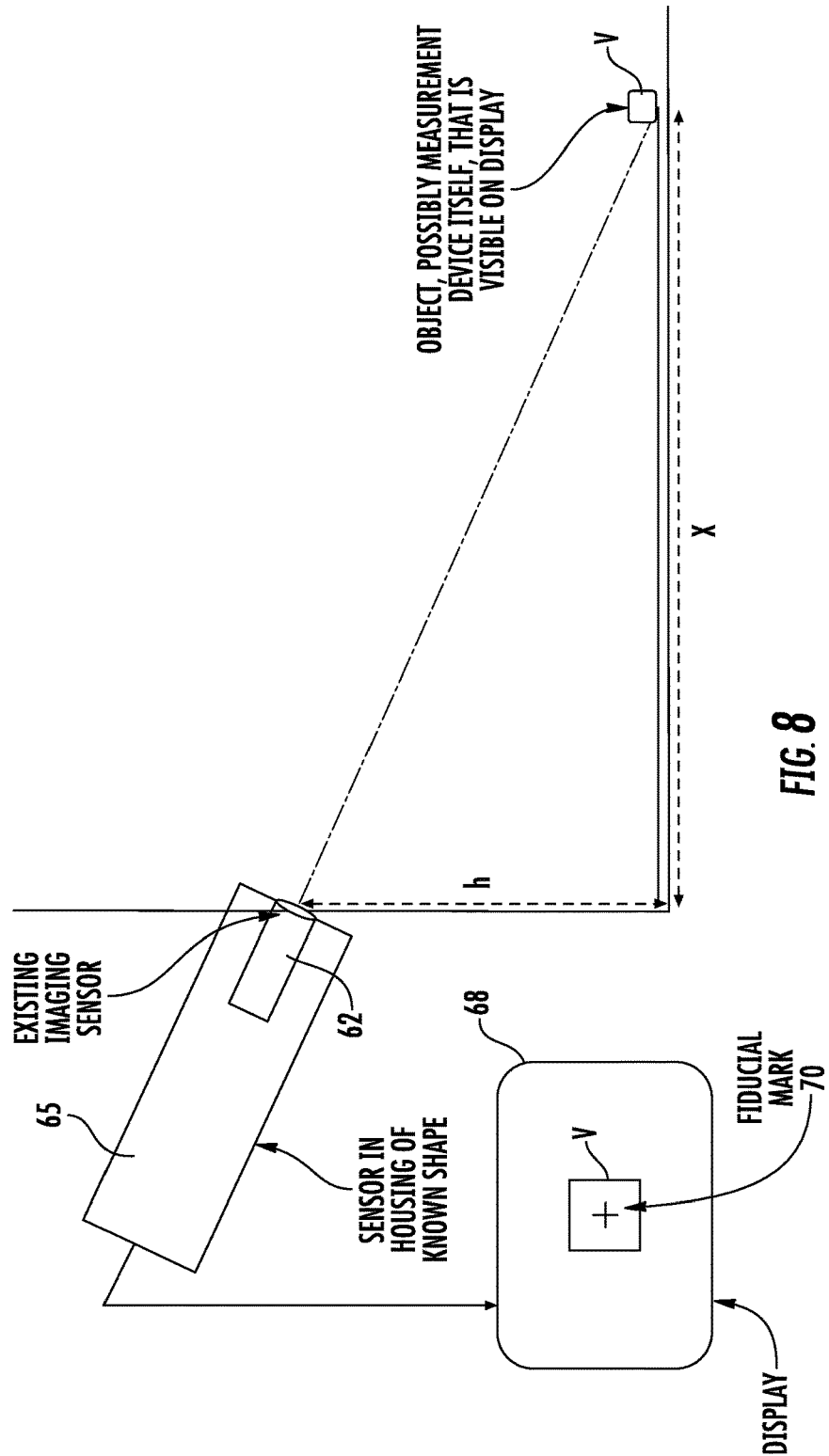
FIG. 8 is a perspective view of a 3D sensor installation according to another disclosed non-limiting embodiment.

With reference to FIG. 8, in an alternate embodiment, the 3D sensor 62 is installed in a housing 65 of a known shape and mounting. In this case ($\rho$, $\theta$, $\Phi$) are known a priori with respect to the housing (and hence to the world coordinate system by the housing shape and mounting). Further, the origin of the world coordinate system may be directly below the sensor 62 that is mounted at a known height h. In this embodiment a precomputed calibration matrix may be used since all 6 "measurements" (x,y,z) and ($\rho$, $\theta$, $\Phi$) are known.

In another embodiment, some installation conditions may make it impossible or undesirable to install the 3D sensor at the designed operating height. Under these conditions it may be necessary to install the 3D sensor at a different height h' and to change the pitch to some value ρ' such that approximately the same field of view (FOV) is seen by the 3D sensor. Further, it may not be convenient to simply repeat the pre-calibration process or the previously described automatic calibration process at the installed location. In that case, while actual height h' may be measured, but the actual pitch ρ' is more difficult to directly measure, or measure accurately, without additional equipment.

The pitch, in this embodiment, is more difficult to measure and therefore this embodiment includes a display 68 with one or more predefined fiducial marks 70, one fiducial mark preferentially on the sensor axis. The installer needs only to measure one floor location corresponding to the one fiducial mark, enter the data, and the angle calculation is performed automatically by trigonometry.

The user interface further provides visualization for the user of a fiducial mark, if needed, and may provide visual feedback of location or tracking accuracy once the system is calibrated. The feedback may include providing a bounding-box or other indication of tracked objects for the user's visual confirmation of correct location or tracking. This visual feedback is a manual method of determining calibration quality. In alternative embodiments, the system may automatically calculate metrics of the calibration quality. For instance, the rotation part of a T matrix (upper left 3×3 submatrix) should have three singular values all equal to 1. Similarly, the translation and scaling of a T matrix may be bounded by the particular application and values beyond these bounds indicate a poor calibration.

The display 68 may be an existing Hall Position Indicator or other display such as a laptop computer, with the displayed fiducial mark 70 at known (u,v) display coordinates, e.g., displayed as crosshairs in the center of the screen. The installer need only place any visible object, e.g., the body of a tape measure, on the floor in the x direction such that it is aligned with the fiducial mark 70. A simple trigonometric calculation may be performed by the system using the measured distance x and the measured height h' to provide the pitch angle ρ', i.e. $\rho' = -\tan^{-1}(h'/x)$.

These new measurements may then be used in cascade with the previously described predefined calibration matrix where Δh is the difference between h' and the predetermined installation height h, and δρ is the change in depression angle between the original predefined depression angle and the new depression angle, i.e., $$T' = \begin{bmatrix} \cos(\delta\rho) & 0 & \sin(\delta\rho) & 0 \\ 0 & 1 & 0 & 0 \\ -\sin(\delta\rho) & 0 & \cos(\delta\rho) & \delta h \\ 0 & 0 & 0 & 1 \end{bmatrix} \quad (4)$$

Using δh and δρ allows the calibrations to be cascaded, that is, the new T matrix is the product of the original rotation matrix T and the new matrix T'. In an alternative embodiment the actual installation height and new depression angle ρ are used with a direct calculation of a new calibration matrix.

Figure 9:
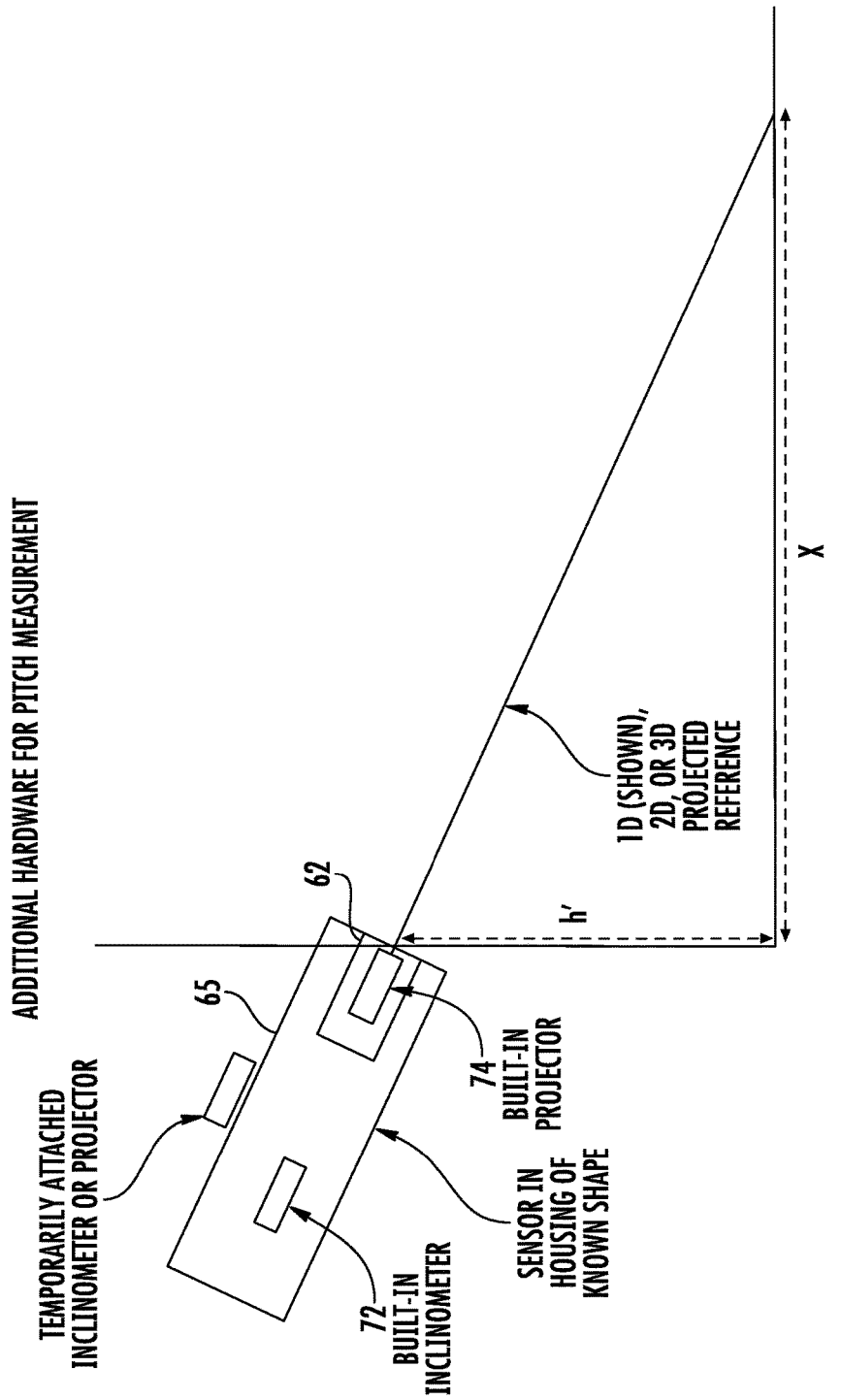
FIG. 9 is a perspective view of a 3D sensor installation according to another disclosed non-limiting embodiment.

With reference to FIG. 9, additional equipment such as an inclinometer 72 or a projector 74 is aligned with respect to the housing 65 of the 3D sensor and, thereby, aligned in a known manner with the 3D sensor 62 itself. The inclinometer 72 may include, but not be limited to, a goniometer, protractor, sextant, tilt meter, tilt indicator, slope gauge, gradient meter, gradiometer, level gauge, level meter, declinometer, clinometer, or other similar device that is directly capable of measuring the pitch angle.

In another alternative, the projector 74 may emit coherent light, e.g., a laser, or incoherent light, e.g., as some combination of wavelengths, at any wavelength(s) to provide a 1D, 2D, or 3D pattern that can be detected. In this embodiment, the distances x and h' may be measured by any common means, e.g., a tape measure, and the same calculation as previously, $\rho' = -\tan^{-1}(h'/x)$, provides the pitch angle. Alternatively, the installer may temporarily provide the additional equipment.

Figure 10:
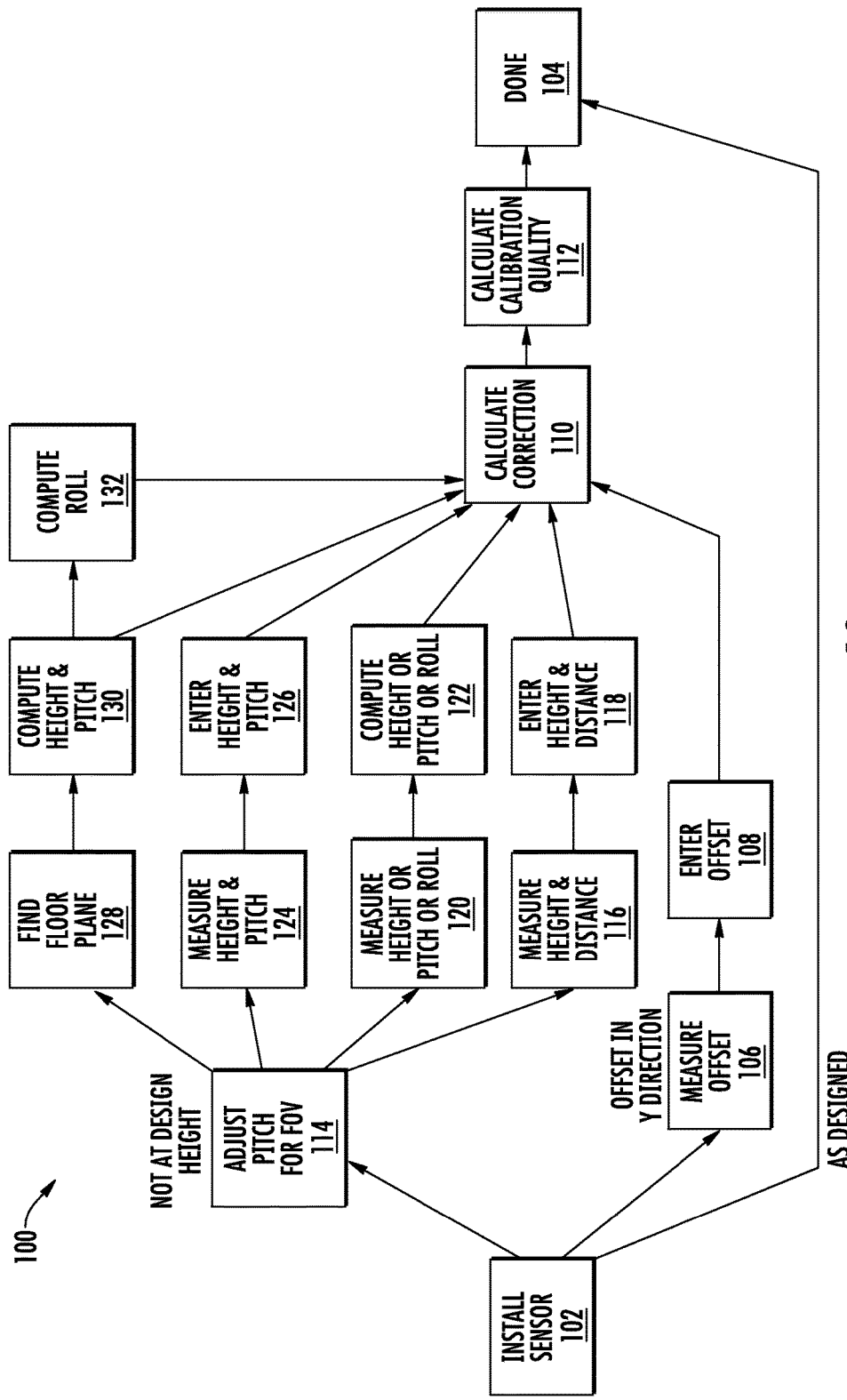
FIG. 10 is a block diagram of a 3D sensor installation process map according to another disclosed non-limiting embodiment.

With reference to FIG. 10, an installation process 100 is schematically illustrated. Initially, an installer mounts the 3D sensor (step 102), preferably directly over the door of an elevator at a pre-specified design height such as 2.3 m and pitch angle such as −40°. If this is possible, then the process immediately terminates (step 104) and the pre-calibration T matrix will be used for potential passenger location or tracking. If the preferred mounting location is not possible, the 3D sensor may be mounted at a different height, not centered over the door, or both.

If the 3D sensor is not mounted at the pre-specified design height over the door, the installer may measure the offset from the desired mounting location or may measure the new location in the world coordinate system (step 106), enter the data (step 108) and a correction to the T matrix will be calculated as described previously (step 110). The process continues with calculation and delivery to the installer of the calibration quality as described previously (step 112) and the process terminates (step 104).

If the 3D sensor is not mounted at the design height the pitch may be adjusted up (if mounted lower than designed) or down (if mounted higher than designed) to achieve the desired FOV (step 114). It should be appreciated that the adjustment of the FoV of the sensor at some orientation/position other than the "design" orientation/position may be other than simply the design height. A squinted sensor, i.e., one mounted over the door but purposefully angled to look more down a long hall, will be appropriately handled by the fully automatic process disclosed elsewhere herein. There are now four example alternatives.

In the first alternative the installed height and distance to a fiducial mark are measured (step 116). The measured height and distance are entered into the system (step 118) and a correction to the T matrix will be calculated as described previously (step 110). The process continues with calculation and delivery to the installer of the calibration quality as described previously (step 112) and the process terminates (step 104).

In the second alternative (step 120) the installed pitch or height or roll is measured, and the system computes the height or the pitch or the roll as described previously (step 122). In this embodiment, measurement of pitch may be readily easier to achieve. A correction to the T matrix will be calculated as described previously (step 110). The process continues with calculation and delivery to the installer of the calibration quality as described previously (step 112) and the process terminates (step 104).

In the third alternative (step 124) the installed height and pitch are measured as described previously (step 124) and entered into the system (step 126). A correction to the T matrix will be calculated as described previously (step 110). The process continues with calculation and delivery to the installer of the calibration quality as described previously (step 112) and the process terminates (step 104). Alternatively, the pitch is measured but everything else is automatically calibrated.

In a fourth alternative a completely automatic T matrix correction is calculated by finding a ground plane as described previously (step 128) and the system computes the height and pitch as described previously (step 130). The process may continue as described previously, i.e., a correction to the T matrix will be calculated as described previously (step 110). The process continues with calculation and delivery to the installer of the calibration quality as described previously (step 112) and the process terminates (step 104). Alternatively, an optional computation of a roll angle (step 132) may precede the calculation of a correction to the T matrix (step 110), calculation and delivery to the installer of the calibration quality as described previously (step 112) and the process termination (step 104).

The process provides for 3D sensor calibration with minimal or no installer effort. That is, the installer does not need special calibration targets nor needs to take measurements in both sensor and world coordinate systems.

The elements disclosed and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

It should be appreciated that relative positional terms such as "forward," "aft," "upper," "lower," "above," "below," "bottom", "top", and the like are with reference to the normal operational attitude and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, disclosed, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically disclosed. For that reason the appended claims should be studied to determine true scope and content.

What is claimed is:

1. An installation process for a 3D sensor of a passenger conveyance system, the process comprising:
    installing a 3D sensor;
    at least partially automatically transforming the 3D sensor coordinate system to a world coordinate system via a calibration matrix, wherein the world coordinate system is at least partially obtained using a depth map;
    determining a pitch of the 3D sensor;
    transforming a floor plane area in the sensor coordinate system to a floor plane area in world coordinates, the floor plane operating as a frame of reference for the world coordinate system;
    at least partially automatically transforming the sensor coordinate system to the world coordinate system in response to the pitch of the 3D sensor via the calibration matrix; and
    adjusting the pitch of the 3D sensor to achieve a desired field of view.

2. The process as recited in claim 1, further comprising:
    determining a height of the 3D sensor; and
    at least partially automatically calibrating the sensor coordinate system to the world coordinate system in response to the height of the 3D sensor via the calibration matrix.

3. The process as recited in claim 1, wherein determining the pitch of the 3D sensor includes placing a target with reference to a fiducial mark generated by the 3D sensor in an X-direction.

4. The process as recited in claim 3, further comprising a Hall Position Indicator with the displayed fiducial mark displayed as crosshairs on a display.

5. The process as recited in claim 1, wherein determining the pitch of the 3D sensor includes using the distance in the X-direction and the height of the 3D sensor to calculate the pitch of the 3D sensor.

6. The process as recited in claim 1, wherein determining the pitch of the 3D sensor includes utilizing an inclinometer.

7. The process as recited in claim 1, wherein determining the pitch of the 3D sensor includes direct measurement.

8. The process as recited in claim 1, wherein determining the pitch of the 3D sensor includes utilizing a projector.

9. The process as recited in claim 8, wherein the projector emits a coherent beam.

10. The process as recited in claim 9, wherein determining the pitch of the 3D sensor includes utilizing a laser.

11. The process as recited in claim 8, wherein the projector emits an incoherent beam.

12. The process as recited in claim 11, wherein determining the pitch of the 3D sensor includes projecting electromagnet radiation.

13. The process as recited in claim 11, wherein determining the pitch of the 3D sensor includes projecting a pattern.

14. The process as recited in claim 1, further comprising:
    installing the 3D sensor adjacent to a door of an elevator.

15. The process as recited in claim 1, further comprising:
    installing the 3D sensor adjacent to a door of an elevator that is not at a pre-specified design height.

16. An auto-calibration system for installing a 3D sensor adjacent to a door of an elevator, comprising:
    a depth-sensing sensor;
    a device operable to determine a pitch of the 3D sensor; and
    a processor in communication with the depth-sensing sensor, the processor operable at least partially automatically transforming a 3D sensor coordinate system to a world coordinate system via a calibration matrix, wherein the world coordinate system is at least partially obtained using a depth map and a floor plane is utilized as a frame of reference for the world coordinate system such that the 3D sensor pitch is adjusted to achieve a desired field of view.

17. The system as recited in claim 16, wherein the depth-sensing sensor includes at least one of structured light, phase shift, time of flight, stereo triangulation, sheet of light triangulation, light field cameras, coded aperture cameras, computational imaging techniques, simultaneous localization and mapping (SLAM), imaging radar, imaging sonar, scanning LIDAR, and flash LIDAR.

18. The system as recited in claim 16, wherein the device includes at least one of an inclinometer, a projector, and a display.

19. The system as recited in claim 16, wherein the depth-sensing sensor is adjacent to a door of an elevator that is not at a pre-specified design height.

20. The system as recited in claim 16, wherein the depth-sensing sensor is adjacent to a door of an elevator.

* * * * *